July 5, 1949.　　　　E. J. ROBICHAUD　　　　2,475,519
CHUCKING APPARATUS
Filed July 26, 1946　　　　　　　　　　2 Sheets-Sheet 1
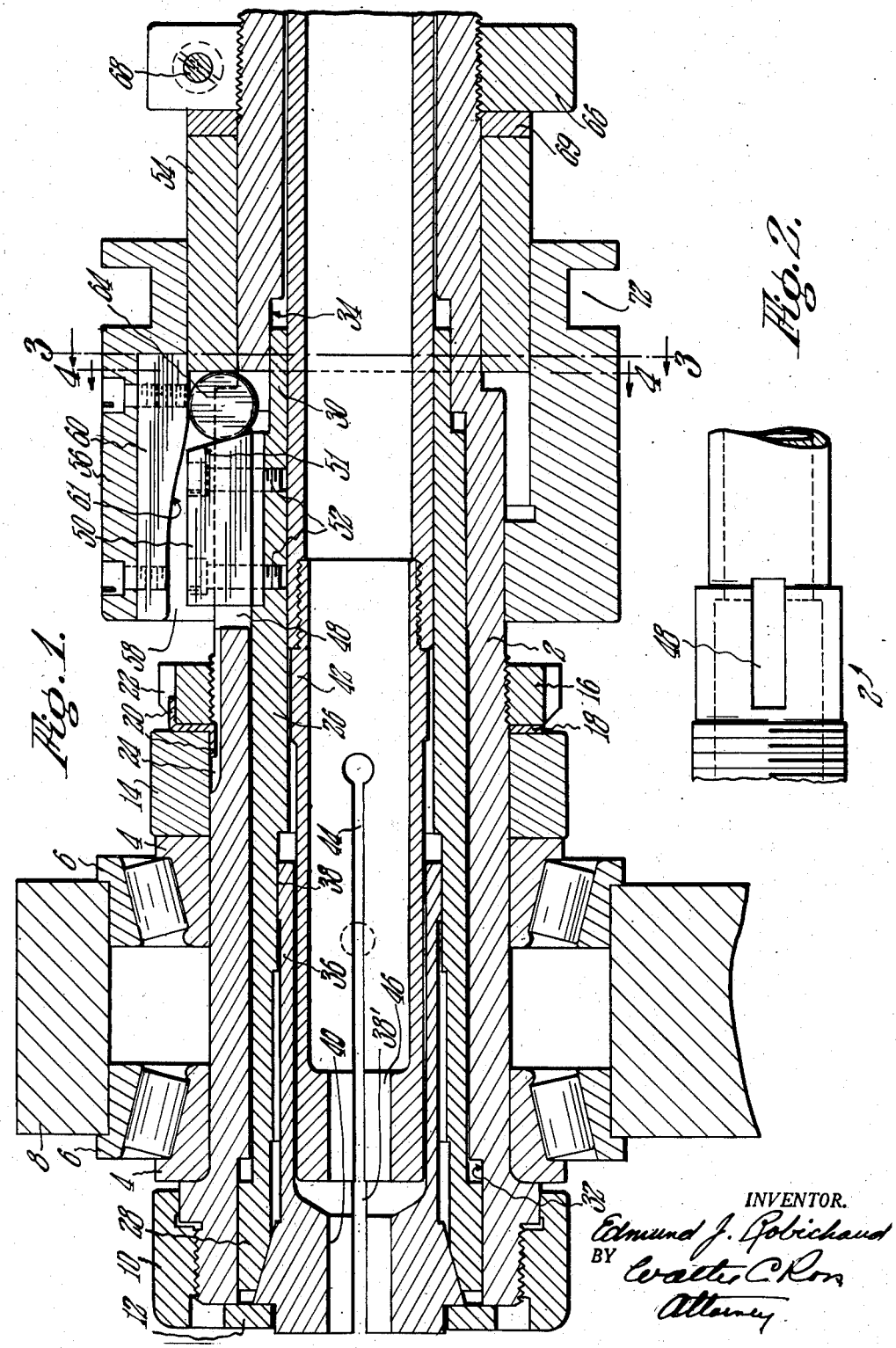
INVENTOR.
Edmund J. Robichaud
BY Walter C. Ron
Attorney July 5, 1949. E. J. ROBICHAUD 2,475,519
CHUCKING APPARATUS
Filed July 26, 1946 2 Sheets-Sheet 2
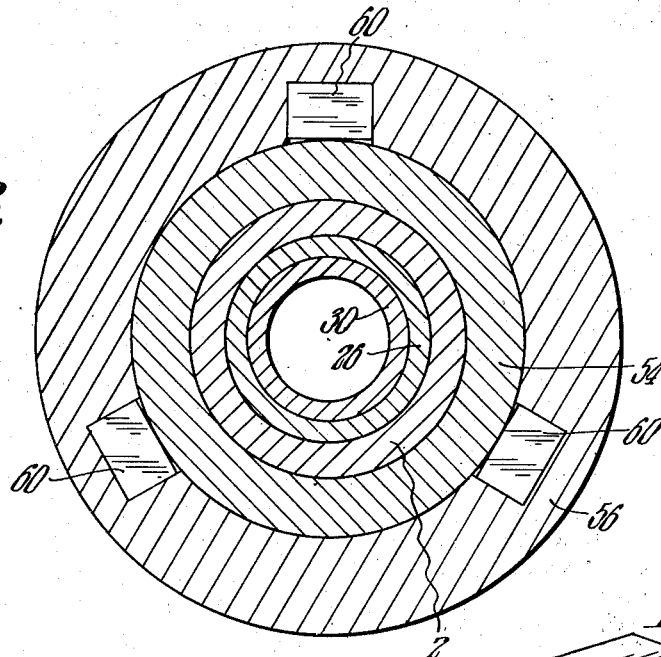
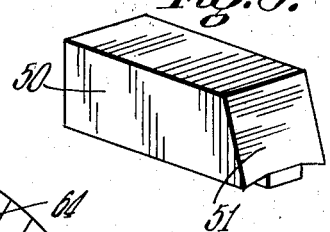
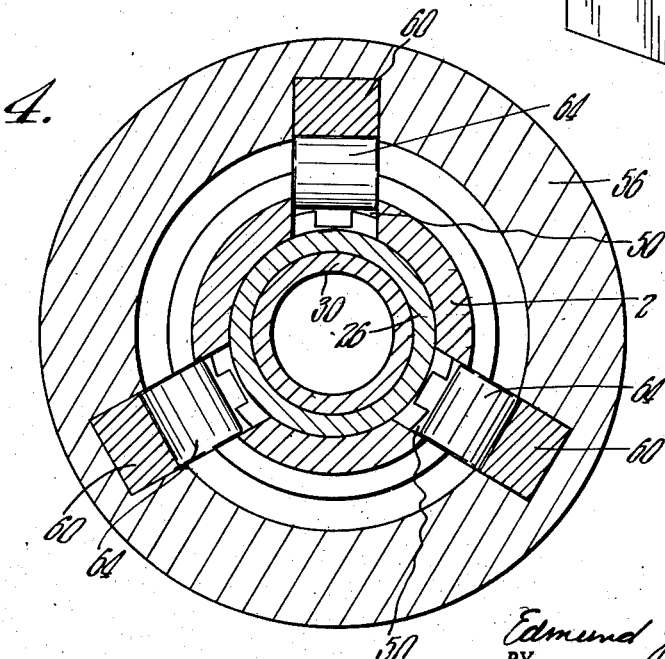
INVENTOR.
Edmund J. Robichaud
BY Walter C. Rose
Attorney.

Patented July 5, 1949

2,475,519

UNITED STATES PATENT OFFICE 2,475,519

CHUCKING APPARATUS

Edmund J. Robichaud, Middletown, Conn., assignor to The Waterbury Farrel Foundry and Machine Company, Waterbury, Conn., a corporation of Connecticut Application July 26, 1946, Serial No. 686,403

1 Claim. (Cl. 279—57)

This invention relates to improvements in machine tools and is directed more particularly to improvements in spindle construction therefor.

The principal object of the invention is the provision of a novel spindle construction for an automatic machine tool which is adapted to perform various successive operations on a bar of stock.

According to special novel features of the invention, the spindle construction is characterized by a chucking mechanism adapted for gripping and releasing a bar of stock while the spindle is in rotation. The mechanism is constructed in such a way that bar gripping means operates when released to instantly expand to effect a quick release of the bar while at the same time the bar gripping means is easily and readily operated for gripping a bar.

While reference is made to a bar of stock, it will be understood that the novel construction of the invention is adapted for a work piece as well. That is, successive work pieces or pieces of work may be gripped and released wherefor bar of stock will include work pieces and the like, it not being intended to be limited to bar stock merely.

The novel features of the invention are adapted for broad application and various changes and modifications may be made in the form of the invention, at present preferred, without departing from the spirit and scope thereof.

In the drawings:

Fig. 1 is a sectional longitudinal view through the forward or outer end of a spindle having the novel features of the invention associated therewith;

Fig. 2 is a small scale plan view of an intermediate portion of the spindle shown in Fig. 1;

Figs. 3 and 4 are sectional elevational views on the lines 3—3 and 4—4 respectively of Fig. 1; and Fig. 5 is a perspective view of one of the wedges of the mechanism.

Referring now to the drawings more in detail, the invention will be fully described.

A hollow spindle is represented by 2, the outer end of which is mounted in the inner races 4 of anti-friction bearings which have their outer races 6 mounted in a frame 8 which may be the frame of an automatic machine. It will be understood that the oposite or inner end of the spindle will be suitably mounted for rotation in said machine.

A nose plate 10 is in screw threaded engagement with the outer or forward end of the spindle 2 and has an inwardly extending abutment lip or flange 12.

A collar 14 abuts the innermost inner race 4 and a lock nut 16 in threaded engagement with the spindle is held against turning by a lock washer 18 which has tongues 20 disposed in slots 22 and 24 of the nut and spindle. The parts described are arranged to facilitate free rotation of the spindle and hold it against axial displacement.

A hollow chucking tube 26 is disposed within the spindle and has a forward end 28 and a rear end 30 guided for sliding movements relative to the spindle in journals 32 and 34 provided in said spindle.

A hollow collet 36 is slidable at 38 in the tube 26 and its outer forward end is outwardly flaring and complemental to a tapering or converging entrance to the bore of the tube 26, as shown. The collet is provided with a plurality of circumferentially spaced longitudinal slots such as 38' and it is so constructed that its outer or forward end may be contracted to grip a bar of stock in a central opening 40 thereof while it may expand so as to release said bar.

The collet is acted upon by the tube 26 which when moved forwardly of the spindle or to the left of the position shown in the drawings, it acts on the flaring end of the collet to contract or close it. When the tube 26 moves inwardly of the spindle, the collet is released so it may quickly expand or open.

A feed tube construction 42 is shown as disposed within the spindle and collet. Said tube 42 is provided with longitudinal slots such as 44. A bar of stock may extend through the feed tube and an opening 46 at the forward end thereof. As is usual, the feed tube may be moved forwardly by any suitable means to position a bar of stock within the collet which grips the bar for a machining operation.

The spindle intermediate its ends is provided with circumferentially spaced longitudinal slots 48 as shown in Fig. 2. Wedge members 50 are disposed in said slots 48 and are secured to the inner end of tube 26 by any suitable means such as screws 52. Inner faces 51 of said shoes 50 are inclined radially and forwardly as shown in Fig. 1. These shoes are of substantial transverse width.

A sleeve 54 is loose on the spindle 2 and a spool member 56 is movable back and forth on the spindle 2 and said sleeve.

Said spool is provided with circumferentially spaced radially disposed interior slots 58 agreeing in number with the slots 48 of the spindle. Shoes 60 are disposed in said slots 58 and are secured therein by screws, as shown.

The slots 48 and 58 are of the same transverse width and rolls 64 equal in length to the width of the slots are disposed therein with the longitudinal axes transverse to that of the spindle.

Inner cam faces 61 of the shoes 60 extend forwardly and outwardly of the longitudinal axis of the spindle and are flat transversely. The rolls 64 are in the form of cylinders having parallel longitudinal faces which are complemental to the flat transverse faces 51 and 61 of the wedges and shoes.

The rolls 64 being disposed in the slots 48 and 58 of the spindle and spool said spindle and spool are held against relative rotation.

An adjusting collar 66 is in threaded engagement with the spindle and is preferably of the split type having a bolt 68 therethrough for clamping it in adjusted position. There may be a washer 69 between the collar 66 and sleeve 54 if desired.

The spool is provided with a circumferential groove 72 in which shifting means may be disposed for moving the spool back and forth relative to the spindle.

In the position of the parts shown, the spool is in forward collet closing position. In this position the rolls 64 have been moved radially inwardly by the cam faces 61 so as to abut the outer end of sleeve 54 and act on the inclined faces 51 of the wedges to urge the tube 26 outwardly or forwardly whereby the collet is closed.

When the spool 56 is moved to the right or inwardly of the spindle, the cam faces 61 allow the rolls 64 to move outwardly or radially. Thereby the tube 26 may move inwardly of the spindle. The spring action of the outer end of the collet acts on the tube 26 to move it inwardly or rearwardly whereby the collet is released and free for instantaneous expansion or opening.

The collar 66 may be adjusted to position the inner end of the sleeve 54 to obtain the desired action of the collet operating means.

The cam faces 51 and 61 of the wedges and shoes being parallel and complemental to the faces of the rolls 64, a considerable contactable area is provided not only to insure long life of the parts but there being the considerable area of contact it is possible to exert the desired pressure for the gripping of the bar of stock.

The construction is adapted for quick opening and closing of the collet while the spindle is in rotation. The inherent tendency of the collet to open is taken advantage of and the parts are constructed and arranged to resist wear to the end that long life is facilitated.

Various changes and modifications may be made in the form of the invention without departing from the spirit and scope thereof.

I claim:

A spindle and chucking construction comprising in combination, a spindle having a longitudinal bore, a collet operating chucking tube movable back and forth in said bore and provided with a longitudinal bore and a converging collet entrance extending inwardly from its outer forward end, a hollow collet in the bore of said tube having circumferentially spaced longitudinally and radially extending slots in its outer end whereby said outer end is contractible and expansible, the peripheral portion of the collet at its outer end converging inwardly complemental to the collet entrance of the bore of said tube, means on the outer end of said spindle engageable by said collet for holding it against movement outwardly of the spindle, said spindle intermediate its opposite ends and rearwardly of said collet provided with circumferentially spaced radially extending longitudinal slots leading into the bore thereof, longitudinally extending wedges secured to said chucking tube disposed in said slots of the spindle having radially extending rear forwardly inclining flat faces arranged in planes which are generally transverse to the longitudinal axis of the spindle, a hollow sleeve member fixed on said spindle rearwardly of said wedges having a flat forward face disposed transversely to the longitudinal axis of the spindle, a hollow spool member reciprocable on the spindle having inner longitudinal and radially extending grooves in alignment with the slots of the spindle, longitudinal shoes fixed in said grooves having inner longitudinal flat cam faces over said wedges disposed in forwardly diverging relation transversely of the longitudinal axis of the spindle, and elongated rolls between the forward face of the sleeve member and rear faces of the wedges having parallel longitudinal faces disposed transversely to the longitudinal axis of the spindle, all adapted and arranged whereby as the spool member is moved forwardly on said spindle said cam faces of the shoes act on said rolls to wedge them between said sleeve and wedges to move said tube forwardly for contracting the forward end of said collet.

EDMUND J. ROBICHAUD.

REFERENCES CITED

The following references are of record in the file of this patent:

UNITED STATES PATENTS

| Number | Name | Date |
| --- | --- | --- |
| 425,224 | Hartness | Apr. 8, 1890 |
| 605,166 | Johnson | June 7, 1898 |
| 2,310,259 | Ruppell | Feb. 9, 1943 |
| 2,261,380 | Jelinek et al. | Nov. 4, 1941 |
| 2,375,734 | Montgomery | May 8, 1945 |